United States Patent Office 2,921,930
Patented Jan. 19, 1960

2,921,930

THICKENING AGENTS

Eugene C. Suhrie, Aliquippa, Pa., assignor to Koppers Company, Inc., a corporation of Delaware No Drawing. Application March 3, 1955
Serial No. 492,037

4 Claims. (Cl. 260—78.5)

This application is concerned with certain improved thickening agents and processes for their production. Generally the invention is concerned with improved thickening agents obtained by heating a styrene-ethylenically unsaturated dibasic acid copolymer in the presence of a hydroxyl group-containing compound having surface active properties at a temperature of at least 70° C. and below the decomposition temperature of the resulting product until the product having markedly higher viscosity than the viscosity of the original copolymer is obtained. More particularly the invention is concerned with styrene-maleic anhydride copolymers which are treated as described above in the presence of a polyoxyethylated monohydric aliphatic alcohol in which the carbon content of the alcohol is in the range of from approximately 12 to 18 carbon atoms.

The invention is further concerned with a process for the production of the above-mentioned improved thickening agents wherein the styrene-ethylenically unsaturated dibasic acid copolymer is prepared in the presence of a surface active agent in solution in an inert organic solvent such as, for example, toluene, and in which the copolymer is separated from the inert solvent by evaporation of said solvent therefrom. Thereafter the evaporated residue is heat-treated as described above to yield the improved thickening agent. In another aspect the invention is concerned with the heat-treatment of the combination of a styrene-ethylenically unsaturated dibasic acid copolymer and a hydroxyl group-containing surface active agent at the above indicated temperatures.

The use of styrene-maleic hydride copolymers in the form of their partial or complete alkali salts as thickening agents in, for example, rubber or copolymer latices is known. It has been discovered as a feature of this invention, that thickening agents or markedly increased viscosities are obtained when a styrene-ethylenically unsaturated dibasic acid copolymer is heated in the presence of a hydroxyl group-containing compound having surface active properties at a temperature of above 70° C. and below the decomposition temperature of the resulting product. Temperatures in the range 70°–180° yield good results although it will be realized that the lower the temperature the longer is the treatment time required. At the range 70–120° C. there is little if any, deleterious effect on the polymers or the resulting product on long continued heating. Above 120° C. and, for example, up to approximately 180° C., it is observed that the viscosity of the resulting product increases with time up to a maximum and that thereafter, apparently due to break down or decomposition, the viscosity decreases upon continued heating.

As used herein the term "viscosities" refers to the viscosities of twenty-five percent aqueous solutions of the thickeners in the form of their partial or complete alkali salts.

It has been observed that among the hydroxyl group-containing surface active compound the oxyethylated derivatives of monohydric aliphatic alcohols having a carbon content in the range approximately 12 to 18 carbon atoms per molecule yield excellent results when used in the range of from about one to about five percent by weight based on the total weight of copolymer. While no harmful effect is observed by the use of the above-referred to surface active compounds in amounts in excess of five percent the increase in viscosity apparently reaches a maximum with the use of about five percent of said surface active compounds.

Heretofore the reaction of styrene-maleic anhydride has yielded thickening agents having viscosities (25 percent aqueous solution of the ¾ sodium salt) in the range of from 2000 to 4000 centipoises. It has been discovered as a feature of this invention that viscosities in the range of approximately 8000 to as high as 2,000,000 centipoises are obtained by the processes of this invention.

In general, the molar ratio of styrene to ethylenically unsaturated dibasic acid should be at least equal to 1:1 and preferably in the range of from 1:1 to 5:4 since the water solubility of the alkali salt of the copolymer decreases with decreasing acid content. It will be understood that, while herein there is reference made to styrene ethylenically unsaturated dibasic acid copolymers, this term embraces the anhydride of said acids. Such ethylenically unsaturated dibasic acids as maleic, itaconic, citraconic, mesaconic and the like are contemplated, it being understood that the acid or its anhydride form is copolymerizable with styrene.

The preferred hydroxyl group containing surface active compounds are the polyoxyethylated derivatives of alcohols containing from approximately 12 to 18 carbon atoms, that is the reaction products of ethylene oxide and such alcohols as, for example, lauryl, myristyl, palmatyl, and stearyl alcohols.

Although the presence of the hydroxyl group-containing surface active agents is essential during the heating step it can be omitted during the polymerization step. However, its presence is advantageous in that the viscosity of the polymerization mixture can be changed or varied by its presence.

The invention is illustrated by the following preferred embodiments in which "parts" and "percent" indicates parts and percents by weight unless otherwise specified.

EXAMPLE 1

Five (5.0) parts "Emulphor ON" are added to 75 parts toluene and the mixture agitated for five minutes. There is then added 12.13 parts maleic anhydride and the mixture agitated for approximately five minutes. Then there is added 4.13 parts styrene containing 0.08 part benzoyl peroxide and the mixture heated over a half-hour period to approximately 80° C. Thereafter 8.75 parts styrene containing 0.17 part benzoyl peroxide is added at the rate of one-half percent per minute. The temperature is then maintained for one additional hour at 80° C. after which the mixture is heated over a half-hour period to 90° C. where it is held for eight hours. There is obtained a slurry of copolymer in toluene which is divided into two equal parts.

Part A is filtered to remove toluene therefrom and equal portions thereof heated respectively at 120° C. for fifteen hours and at 150° C. for two hours. The polymers are slurried in water sufficient to produce a 25 percent concentration of the ¾ sodium salt of the copolymer, heated to approximately 160° C. and sodium hydroxide in amount to form ¾ sodium salt is stirred in. The viscosities are measured at 25° C. The material treated at 120° C. has a viscosity in the range 10–30,000 centipoises while the material treated at 150° C. has a viscosity in the range 10—50,000 centipoises.

Part B of the polymer slurry is treated to remove the toluene by evaporation and the equal portions of the dried product are heated at 120° C. for sixteen hours and 150° C. for two hours respectively. Twenty-five percent aqueous solutions of the ¾ sodium salts of these materials are formed as described above. The viscosity of the material treated at 120° C. is in the range 50–100,000 centipoises while the material treated at 150° C. has a viscosity in the range 500,000–2,000,000 centipoises.

"Emulphor ON" is stated by H. Bennett in the Concise Chemical and Technical Dictionary (copyright 1947) to be a polyethylene oxide condensation product with oleyl alcohol. This condensation product is water-soluble, as is indicated on page 315 of the Technical Manual and Year Book (1952) of the Americal Association of Textile Chemists and Colorists.

EXAMPLE 2

Example 1 is repeated except that there is used only one part "Emulphor ON" surface active agent. The viscosities of the part A materials, that is, that in which the toluene is separated from the copolymer by filtration are in the range of 8–25,000 for the material treated at 120° C. for sixteen hours and in the range 10–40,000 for the material treated at 150° C. The viscosities of the part B material are substantially those of the part A material for the respective temperatures.

EXAMPLE 3

The polymerization of Example 1 is repeated except that the "Emulphor ON" surface active agent is omitted. There is then added to the polymer slurry 5 parts "Emulphor ON" surface active agents and the slurry divided into parts A and B which are treated as described in Example 1. The portion of the part A treated at 120° C. for sixteen hours has a viscosity in the range 10–30,000 while that portion treated at 150° C. for two hours has a viscosity in the range 10–50,000 centipoises. The portions of the part B material (from which the toluene is removed by evaporation) have viscosities in the range 50–100,000 centipoises for the material treated at 120° C. for two hours and in the range 500,000–2,000,000 for the material treated at 150° C. for two hours.

EXAMPLE 4

The polymerization of Example 1 is repeated except that the "Emulphor ON" surface activator is omitted. The polymer slurry is divided into parts A and B which are treated as described in Example 1. Each of the portions of parts A and B respectively have viscosities in the range 2000–4000 centipoises whether treated at 120° C. for 16 hours or at 150° C. for 2 hours. It is noted that whether the polymer is separated from the toluene by filtration or evaporation has no effect on the resulting viscosity of the ¾ salt.

While the foregoing examples have dealt with the ¾ sodium salts it will be realized that substantially similar results are obtained by the use of other monovalent alkaline salts such as, for example, the ammonium, potassium and lithium salts. Similarly, the above-referred to ethylenically unsaturated dibasic acids can be substituted for maleic anhydride in the foregoing examples to yield similar results. Additionally, while the foregoing examples illustrate the use of 1:1 styrene-ethylenically unsaturated dibasic acid molar ratios similar results are obtained utilizing styrene-unsaturated acid ratios as high as about 5:4.

It is further to be understood that while the foregoing examples are concerned with the heat treatment of the copolymer in the presence of the hydroxyl group-containing surface active compound in the dry state, similar results are obtained by treatment in a slurry in an inert compound, such as for example, toluene, although this must be done under superatmospheric pressure because of the boiling point of toluene. The effect of temperatures in excess of 120° C. on the treatment in the slurry form are substantially the same as those observed in the treatment in the dry form.

Table 1 illustrates the marked difference in the viscosities of the thickening agents of this invention and those which either do not contain a hydroxyl-containing surface active agent or which have not been heat-treated as described above.

Table 1

| Thickener | | Viscosity in Centipoises | |
|---|---|---|---|
| | | Treated for 16 hrs. at 120° C. | Treated for 2 hrs. at 150° C. |
| Example 1: 5% Emulphor ON during polymerization. | Part A | 10,000– 30,000 | 10,000– 50,000 |
| | Part B | 50,000–100,000 | 500,000–2,000,000 |
| Example 2: 1% Emulphor ON during polymerization. | Part A | 8,000– 25,000 | 10,000– 40,000 |
| | Part B | 30,000– 75,000 | 50,000– 150,000 |
| Example 3: 5% Emulphor ON after polymerization. | Part A | 10,000– 30,000 | 10,000– 50,000 |
| | Part B | 50,000–100,000 | 500,000–2,000,000 |
| Example 4: No surfactant. | Part A | 2,000– 4,000 | 2,000– 4,000 |
| | Part B | 2,000– 4,000 | 2,000– 4,000 |

While the invention has been described with reference to particular embodiments thereof, it will be understood that in its broadest aspects the invention may be variously embodied within the scope of the invention as set forth herein and in the appended claims.

I claim:

1. An improved thickening agent comprising the reaction product of a styrene-ethylenically unsaturated dibasic acid copolymer having a styrene to unsaturated acid molar ratio of about 1:1 to 5:4 with about 1–5% by weight, based upon the weight of said copolymer, of a water-soluble polyoxyethylene ether of a monohydric aliphatic alcohol having from 12–18 carbon atoms, said reaction product being obtained by contacting said copolymer and said ether at a temperature of at least 70° C. and below the decomposition temperature of said reaction product until a product of increased viscosity is obtained.

2. A thickening agent of claim 1 wherein said copolymer is a 1:1 styrene-maleic anhydride copolymer, said either is utilized in an amount of 5% by weight based upon the weight of said copolymer, and said copolymer and said ether are contacted at a temperature of about 150° C. for 2 hours.

3. Method of making a thickening agent of improved characteristics comprising copolymerizing styrene and maleic anhydride in toluene tolution in the presence of 1–5% by weight, based upon the total weight of monomers, of a water-soluble polyoxyethylene ether of a monohydride aliphatic alcohol having from 12–18 carbon atoms, removing said toluene by evaporation to obtain a residue, and reacting said residue at a temperature of at least 70° C. and below the decomposition temperature of the reaction product until the viscosity of the product is greater than the original viscosity of said residue.

4. Method of making a thickening agent of improved characteristics comprising copolymerizing styrene and maleic anhydride in toluene solution in the presence of from 1–5% by weight, based upon the total weight of monomers, of a water-soluble polyoxyethylene ether of a monohydric aliphatic alcohol having from 12–18 carbon atoms, removing the toluene from the residue by evaporation, and reacting said residue at a temperature of 150° C. for 2 hours.

References Cited in the file of this patent

UNITED STATES PATENTS

| | | |
|---|---|---|
| 2,047,398 | Voss et al. | July 14, 1936 |
| 2,320,724 | Gerhart et al. | June 1, 1943 |
| 2,324,739 | Stoops et al. | July 20, 1943 |
| 2,359,103 | Gerhart et al. | Sept. 26, 1944 |
| 2,408,690 | Seymour | Oct. 1, 1946 |

UNITED STATES PATENT OFFICE

CERTIFICATE OF CORRECTION

Patent No. 2,921,930                                January 19, 1960

Eugene C. Suhrie

It is hereby certified that error appears in the printed specification of the above numbered patent requiring correction and that the said Letters Patent should read as corrected below.

Column 1, line 45, for "hydride" read -- anhydride --; line 58, after "little" insert a comma; column 2, line 30, after "of" insert -- monohydric aliphatic --; column 4, line 49, for "tolution" read -- solution --.

Signed and sealed this 28th day of June 1960.

(SEAL)
Attest:

KARL H. AXLINE                                                                   ROBERT C. WATSON
Attesting Officer                                                         Commissioner of Patents